(12) United States Patent
Yang

(10) Patent No.: US 8,254,091 B2
(45) Date of Patent: Aug. 28, 2012

(54) PORTABLE ELECTRONIC DEVICE

(75) Inventor: Zeng-Kui Yang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 376 days.

(21) Appl. No.: 12/603,984

(22) Filed: Oct. 22, 2009

(65) Prior Publication Data

US 2011/0007455 A1    Jan. 13, 2011

(30) Foreign Application Priority Data

Jul. 13, 2009   (CN) .......................... 2009 1 0304298

(51) Int. Cl.
*H05K 7/14* (2006.01)

(52) U.S. Cl. ................ 361/679.01; 361/679.55; 292/32; 312/223.2

(58) Field of Classification Search ............. 361/679.01, 361/679.02, 724–727, 679.56, 679.55, 79.58, 361/679.57; 312/223.1–223.2; 292/DIG. 1, 292/DIG. 38, 1, 32, 33, 42, 137, 138, 145, 292/95, 96, 116, 117, 101

See application file for complete search history.

(56) References Cited

U.S. PATENT DOCUMENTS

| | | | | |
|---|---|---|---|---|
| 7,303,216 | B2 * | 12/2007 | Bella et al. ..................... | 292/303 |
| 7,796,381 | B2 * | 9/2010 | Zuo et al. ................. | 361/679.57 |
| 8,027,157 | B2 * | 9/2011 | Shen et al. ............... | 361/679.58 |
| 2008/0193829 | A1 * | 8/2008 | Lu ................................. | 429/100 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A portable electronic device includes a main body, a battery cover, a resisting portion positioned on the main body, and a latching portion positioned on the main body adjacent to the resisting portion. The battery cover includes a latching protrusion and a positioning portion. The latching protrusion passes over and latches with resisting portion; the positioning portion passes over and latches with latching portion.

18 Claims, 5 Drawing Sheets

PORTABLE ELECTRONIC DEVICE

BACKGROUND

1. Technical Field

The present disclosure relates to portable electronic devices and, particularly, to a portable electronic device incorporating a battery cover.

2. Description of Related Art

Portable electronic devices usually include battery covers for covering batteries inside the housings. The battery covers are used frequently when installing and removing batteries.

A typical portable electronic device includes a main body, a battery cover, a button, and a spring. The button is slidably assembled to the main body. The spring abuts between the main body and the button. The button has a protrusion positioned thereon. The battery cover defines a receiving slot therein. The protrusion is engaged in the receiving slot. Thus, the battery cover can be assembled to the main body. In disassembly, the button is pushed and the protrusion is released from the receiving slot. Thus, the battery cover can be disassembled from the main body. However, this kind of the portable electronic device has complex structure, and is inconvenient to operate.

Therefore, there is a room for improvement within the art.

BRIEF DESCRIPTION OF THE DRAWINGS

Many aspects of a portable electronic device can be better understood with reference to the following drawings. The components in the drawings are not necessarily to scale, the emphasis instead being placed upon clearly illustrating the principles of the present portable electronic device. Moreover, in the drawings, like reference numerals designate corresponding parts throughout the several views.

DETAILED DESCRIPTION OF THE EMBODIMENTS

Figure 1:
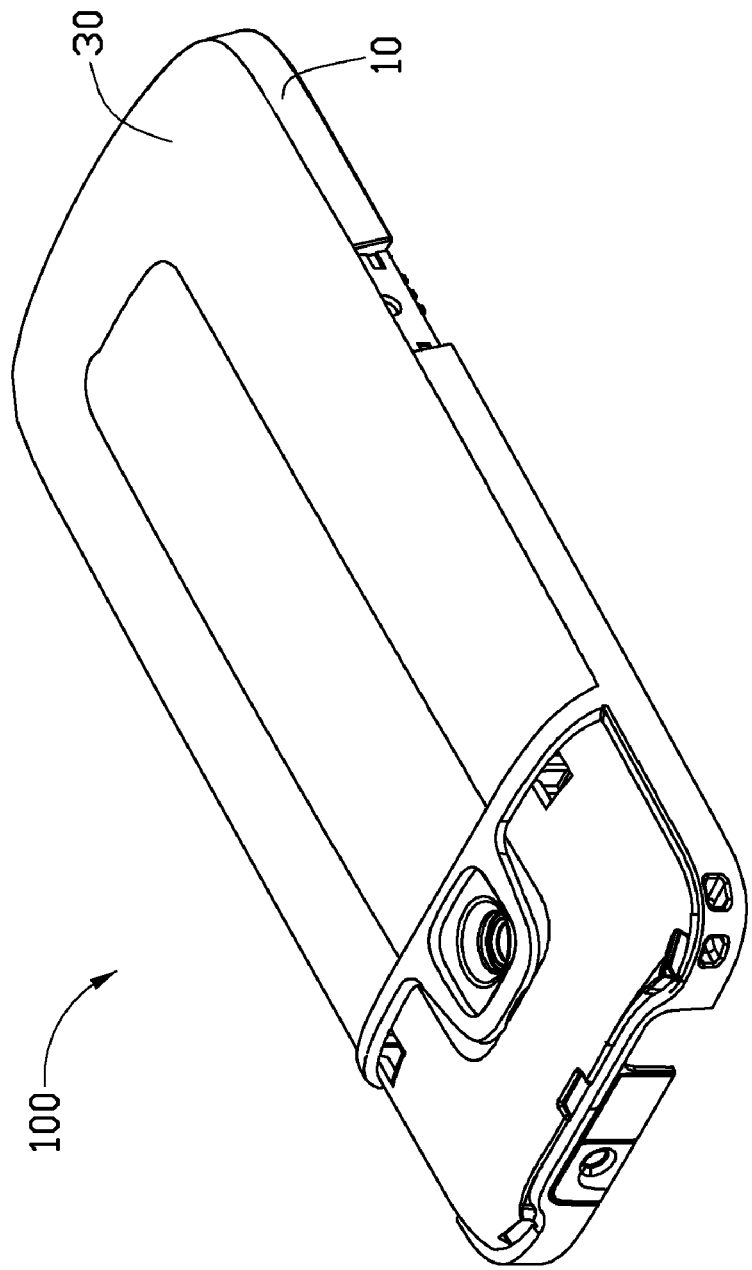
FIG. 1 is a partial isometric view of a portable electronic device according to an exemplary embodiment.

FIG. 1 shows an exemplary embodiment of a portable electronic device 100, such as a mobile phone, a personal digital assistant (PDA) or etc, including a main body 10, a battery cover 30 detachably assembled to the main body 10.

Figure 2:
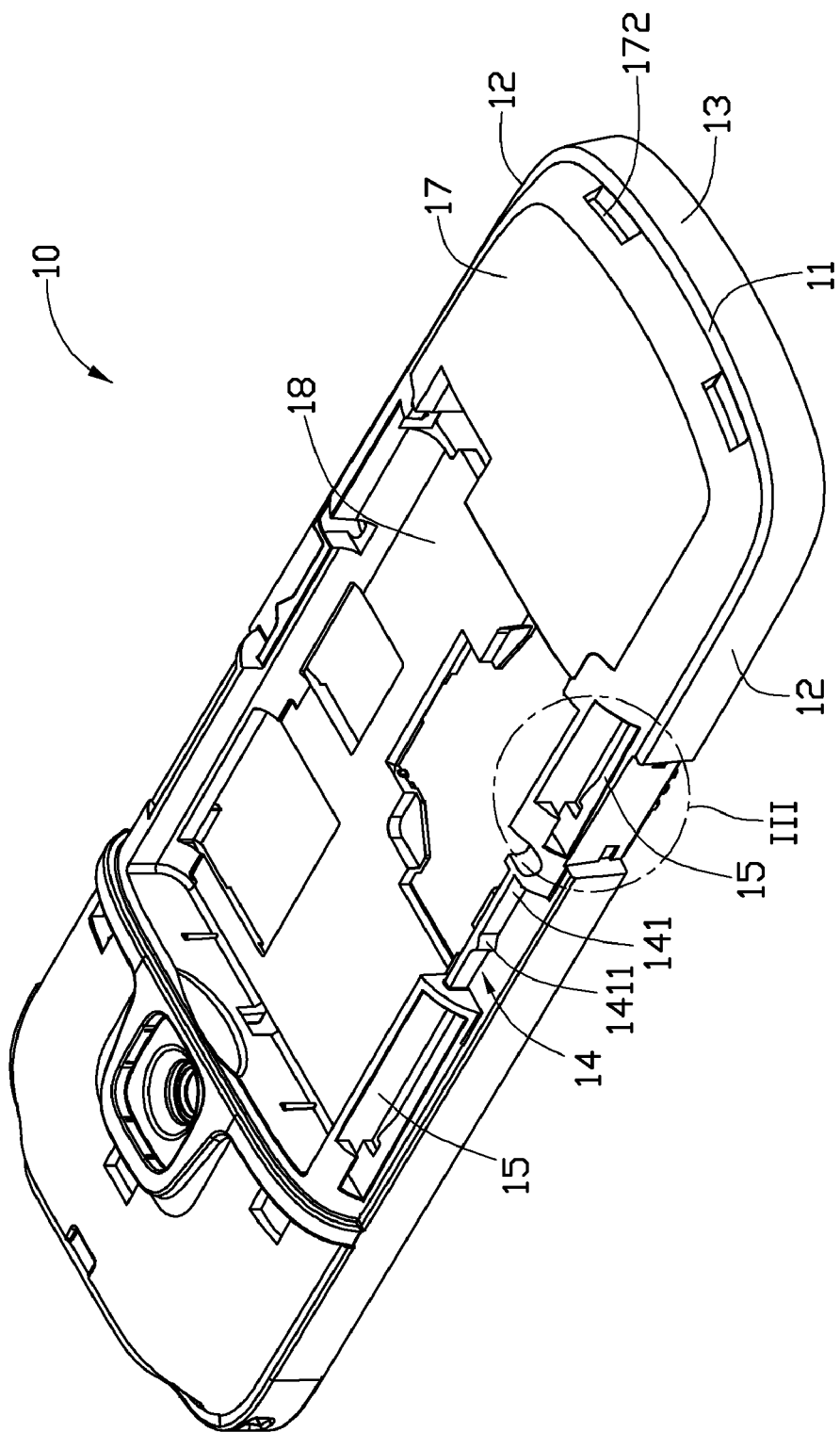
FIG. 2 is an isometric view of a main body of the portable electronic device.

FIG. 2 shows the main body 10 including a top portion 11, one or more opposite sidewalls 12, an end wall 13 connecting the sidewalls 12, one or more resisting portions 14, one or more latching portions 15, and an engaging portion 17. Main body 10 defines a receiving chamber 18 for receiving a battery (not shown).

The resisting portion 14 and the latching portions 15 are positioned adjacent the peripheral edges of the top portion 11. The resisting portion 14 includes a plate portion 141 and a resisting block 1411. The resisting block 1411 is positioned near a middle portion of the plate portion 141. The resisting block 1411 is wedge-shaped and extends away from a surface of the plate portion 141 and point away from the receiving chamber 18.

Figure 3:
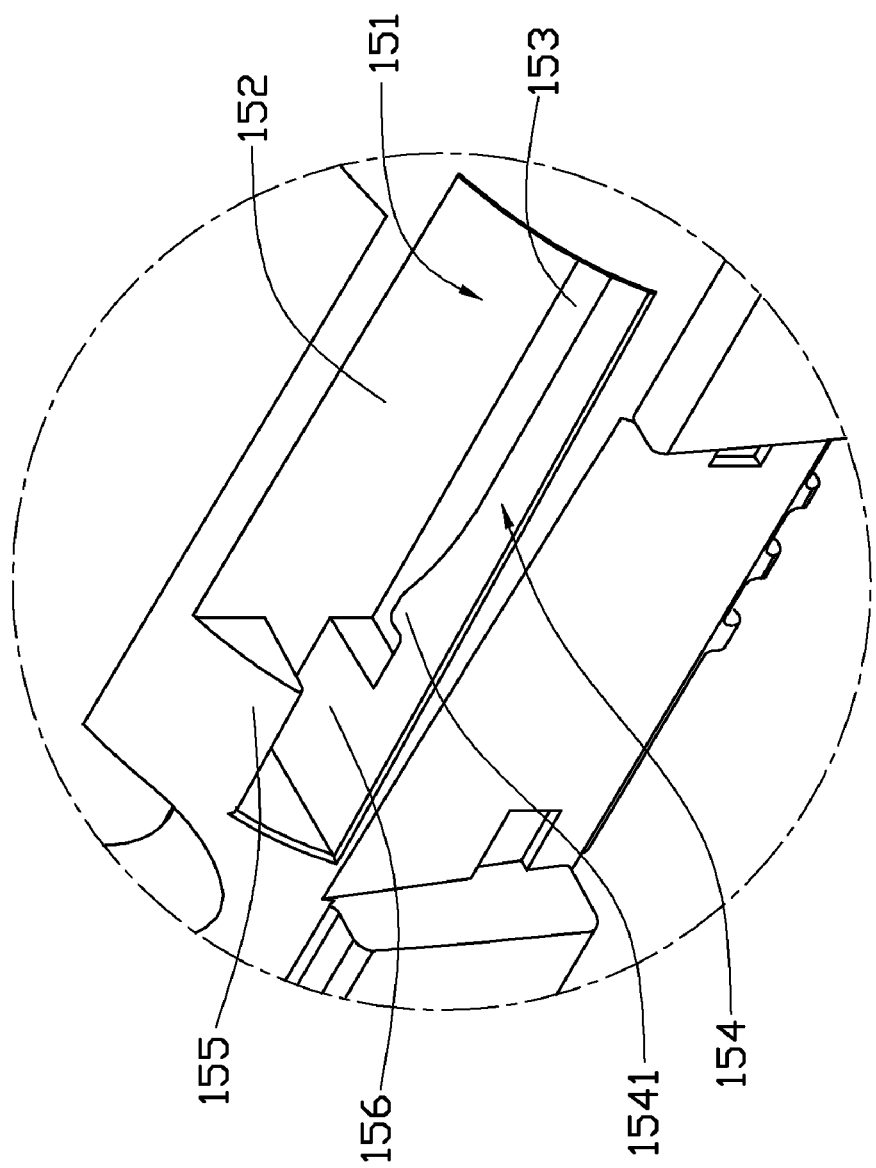
FIG. 3 is an enlarged partial view at III area shown in FIG. 2.

Referring to FIG. 3, each of the latching portions 15 defines an accommodating chamber 151 and a stopping block 155 positioned at a corner of the accommodating chamber 151. The accommodating chamber 151 is enclosed by a side 152 and a wall 154 substantially perpendicular to the side 152. The stopping block 155 and the wall 154 define a sliding groove 156 therebetween. The wall 154 defines a latching slot 153 adjacent to the top portion 11. A baffle plate portion 1541 is defined on the wall 154 and extends from a surface of the latching slot 153 to the side 152. The baffle plate portion 1541 can be made of resilient material such as rubber.

The engaging portion 17 is positioned on the top portion 11 and located adjacent to the peripheral of the end wall 13. The engaging portion 17 defines one or more lateral, spaced latching holes 172.

Figure 4:
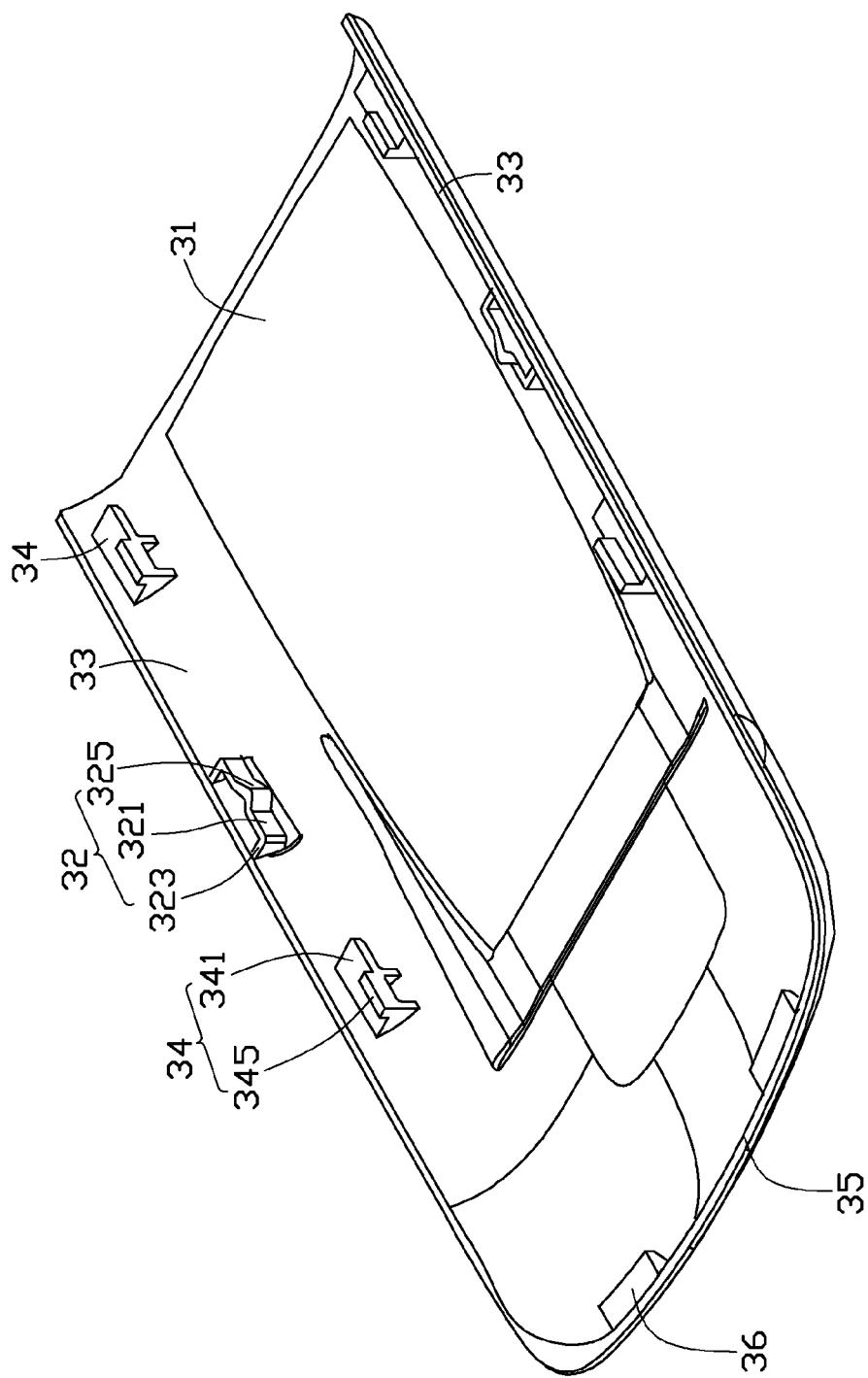
FIG. 4 is an isometric view of a battery cover of the portable electronic device.

FIG. 4 shows the battery cover 30 including a main portion 31, one or more opposite side plate portions 33, an end plate portion 35 connecting the one or more side plate portions 33, one or more latching protrusions 32, one or more positioning portions 34, and one or more extending blocks 36. The latching protrusions 32 includes a support arm 321, two opposite connecting arms 323, and a projection 325. The support arm 321 can be made of resilient materials such as rubbers. The connecting arms 323 extend oppositely from the two ends of the support arm 321 to connect the support arm 321 to the side plate portion 33. The projection 325 projects from near a middle portion of the support arm 321.

Each of the positioning portions 34 includes a base plate portion 341 and a locking block 345. The base plate portion 341 is positioned on the plate portions 33 adjacent to the latching protrusion 32. The base plate portion 341 can slidably engage within the sliding groove 156. The locking block 345 protrudes from the base plate portion 341. The locking block 345 can latch with the latching slot 153. The extending blocks 36 are positioned on the end of the plate portion 35, and can engage into the latching holes 172.

Figure 5:
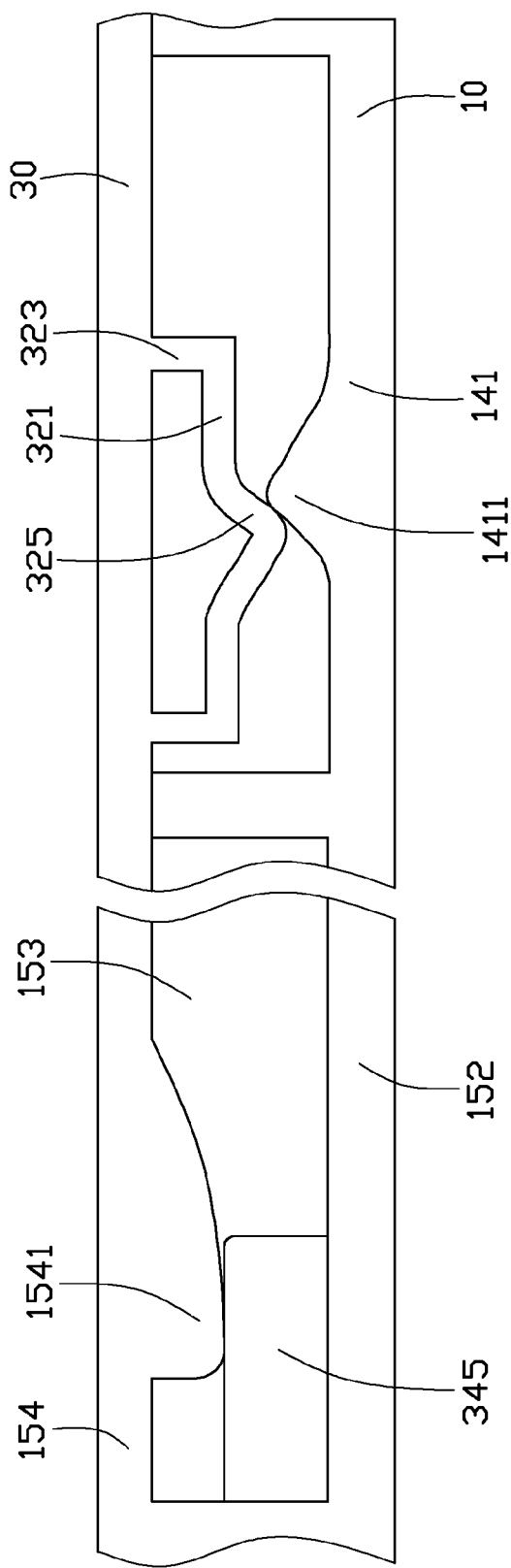
FIG. 5 is a partial isometric view of the battery cover latching to the main body.

Referring to FIG. 5, in assembly, the locking block 345 is received in the latching slot 153. Meanwhile, the extending blocks 36 align with the latching holes 172. The battery cover 30 is pushed towards the main body 10 until the locking block 345 abuts the baffle plate portion 1541, and the projection 325 abuts the resisting block 1411. The battery cover 30 is further pushed, and the locking block 345 deforms the baffle plate portion 1541 to pass over the baffle plate portion 1541. The resisting block 1411 deforms the support arm 321 and the projection 325 passes over and latches with resisting block 1411. Meanwhile, the base plate portion 341 is received in the sliding groove 156. The extending blocks 36 engages in the latching holes 172. Accordingly, the battery cover 30 is assembled to the main body 10.

It is to be understood that the resisting portion 14 and the latching portions 15 also can be symmetrically positioned on one or more opposite peripheral edges of the top portion 11. Accordingly, the latching protrusion 32 and positioning portions 34 are symmetrically positioned on one or more opposite side plate portions 33.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a main body;
   a battery cover including a latching protrusion and a positioning portion;
   a resisting portion including a resisting block positioned on the main body; and
   a latching portion defining an accommodating chamber positioned on the main body adjacent to the resisting portion;
   wherein the latching protrusion passes over the resisting block and latches with resisting portion; the positioning portion is slidably assembled in the accommodating chamber.

2. The portable electronic device as claimed in claim 1, wherein the latching protrusion includes a support arm, two opposite connecting arms, and a projection positioned on the support arm; the connecting arms formed on two ends of the support arm to connect the support arm to the battery cover, the projection abuts the resisting portion.

3. The portable electronic device as claimed in claim 2, wherein the resisting portion includes a plate portion, the resisting block is positioned on the plate portion; the resisting block abuts the projection to deform the support arm.

4. The portable electronic device as claimed in claim 3, wherein the resisting block is wedge-shaped and positioned near a middle of the plate portion.

5. The portable electronic device as claimed in claim 4, wherein the main body includes a top portion defining a receiving chamber and one or more sidewalls, the resisting portion positioned on the top portion between the receiving chamber and a sidewall, the resisting block extending away from the plate portion and opposite to another sidewall.

6. The portable electronic device as claimed in claim 5, wherein a stopping block is positioned at a corner of the accommodating chamber, the accommodating chamber is enclosed by a side and a wall perpendicular to the side, a sliding groove is defined between the stopping block and the wall; the positioning portion is slidably assembled in the sliding groove.

7. The portable electronic device as claimed in claim 6, wherein the positioning portion includes a base plate portion and a locking block positioned on the base plate portion; the base plate portion is slidable in the sliding groove, the wall defines a latching slot, the locking block latches in the latching slot.

8. The portable electronic device as claimed in claim 7, wherein a baffle plate portion extends from a surface of the latching slot to the side, and abuts the locking block.

9. The portable electronic device as claimed in claim 8, wherein the baffle plate portion and the support arm are made of resilient material.

10. A portable electronic device, comprising:
    a main body;
    a battery cover including a latching protrusion, a positioning portion and one or more extending blocks; and
    a resisting portion including a resisting block positioned on the main body;
    a latching portion defining an accommodating chamber positioned on the main body adjacent to the resisting portion;
    wherein the latching protrusion passes over the resisting block and latches with resisting portion; the positioning portion is slidably assembled in the accommodating chamber, and the extending blocks latch to the main body.

11. The portable electronic device as claimed in claim 10, wherein the latching protrusion includes a support arm, one or more connecting arms, and a projection positioned on the support arm; the connecting arms formed on one or more ends of the support arm to connect the support arm to the battery cover, the projection abuts the resisting portion.

12. The portable electronic device as claimed in claim 11, wherein the resisting portion includes a plate portion and the resisting block is positioned on the plate portion; the resisting block abuts the projection to deform the support arm.

13. The portable electronic device as claimed in claim 12, wherein the resisting block is wedge-shaped and positioned near a middle of the plate portion.

14. The portable electronic device as claimed in claim 13, wherein the main body includes a top portion defining a receiving chamber and one or more sidewalls, the resisting portion positioned on the top portion between the receiving chamber and a sidewall, the resisting block extending away from the plate portion and opposite to another sidewall.

15. The portable electronic device as claimed in claim 14, wherein the latching portion defines a stopping block positioned at a corner of the accommodating chamber, the accommodating chamber is enclosed by a side and a wall perpendicular to the side, a sliding groove is defined between the stopping block and the wall; the positioning portion is slidably assembled in the sliding groove.

16. The portable electronic device as claimed in claim 15, wherein the positioning portion includes a base plate portion and a locking block positioned on the base plate portion; the base plate portion is slidable in the sliding groove, the wall defines a latching slot, the locking block latches in the latching slot.

17. The portable electronic device as claimed in claim 16, wherein a baffle plate portion extends from a surface of the latching slot to the side, and abuts the locking block.

18. The portable electronic device as claimed in claim 17, wherein the baffle plate portion and the support arm are made of resilient material.

* * * * *